United States Patent
Sathyanarayana et al.

(10) Patent No.: US 11,089,124 B2
(45) Date of Patent: Aug. 10, 2021

(54) HYBRID PULL AND PUSH BASED STREAMING

(71) Applicant: Verizon Digital Media Services Inc., Dulles, VA (US)

(72) Inventors: Karthik Sathyanarayana, Cypress, CA (US); Harkeerat Singh Bedi, Los Angeles, CA (US); Sergio Leonardo Ruiz, Redondo Beach, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 102 days.

(21) Appl. No.: 16/039,664

(22) Filed: Jul. 19, 2018

(65) Prior Publication Data

US 2020/0028927 A1 Jan. 23, 2020

(51) Int. Cl.
*H04L 29/08* (2006.01)
*H04L 29/06* (2006.01)

(52) U.S. Cl.
CPC .............. *H04L 67/26* (2013.01); *H04L 65/60* (2013.01); *H04L 67/10* (2013.01); *H04L 67/2842* (2013.01)

(58) Field of Classification Search
CPC ..... H04L 67/26; H04L 67/10; H04L 67/2842; H04L 65/60
See application file for complete search history.

(56) References Cited

U.S. PATENT DOCUMENTS

| | | | |
|---|---|---|---|
| 2002/0152318 A1* | 10/2002 | Menon | H04N 21/2225 709/231 |
| 2009/0319557 A1* | 12/2009 | Lipka | H04L 12/1881 |
| 2010/0094964 A1* | 4/2010 | Zuckerman | H04L 67/1097 709/219 |
| 2015/0012593 A1* | 1/2015 | Phillips | H04L 67/2847 709/204 |
| 2016/0255348 A1* | 9/2016 | Panchagnula | H04N 19/146 375/240.02 |
| 2017/0054800 A1* | 2/2017 | DiVincenzo | H04N 21/2187 |

OTHER PUBLICATIONS

XinJie Guan, Push or Pull?: Toward Optimal Content Delivery, 2011, IEEE (Year: 2011).*

* cited by examiner

*Primary Examiner* — John A Follansbee
*Assistant Examiner* — Fadi Haj Said
(74) *Attorney, Agent, or Firm* — Ansari Katiraei LLP; Arman Katiraei; Sadiq Ansari (57) ABSTRACT

Hybrid pull and push based streaming selectively performs a pull-based distribution of a stream to a first point-of-presence ("PoP") of a distributed platform having low demand for the stream, and a push-based distribution of the stream to a second PoP of the distributed platform having high demand for the stream. The push-based distribution may be used to prepopulate the second PoP cache with the live stream data as the live stream data is uploaded from an encoder to a source PoP of the distributed platform, and before that live stream data is requested by the second PoP. In doing so, requests for the live stream data received at the second PoP may result in cache hits with the requested live stream data being immediately served from the second PoP cache without having to retrieve the live stream data from outside the second PoP.

9 Claims, 8 Drawing Sheets

HYBRID PULL AND PUSH BASED STREAMING

BACKGROUND ART

Delivery of live content via the Internet and/or one or more packet-switched networks may be delayed by several seconds relative to a broadcast feed (e.g., over-the-air, cable, and/or satellite) of the same content. Much of the delay can be attributed to the pull-based methodology with which the live stream that encodes the content is delivered to client devices.

Figure 1:
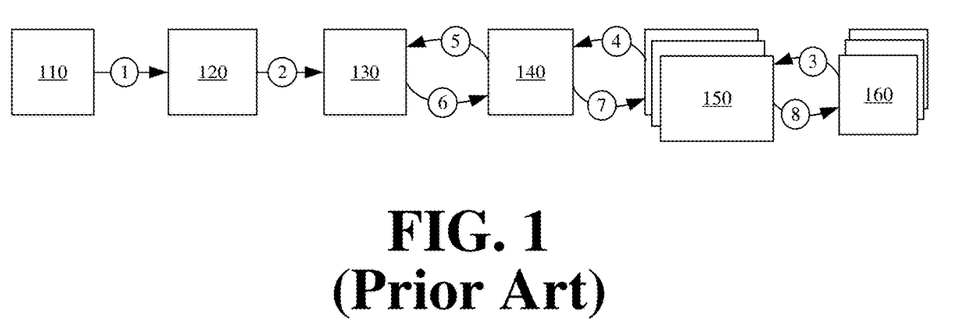
FIG. 1 conceptually illustrates a pull-based methodology for delivering a live media stream.

FIG. 1 conceptually illustrates a pull-based methodology for delivering a live media stream via existing content delivery networks ("CDNs"). The pull-based methodology may be based on interactions between encoder 110, publish point-of-presence ("PoP") 120, storage 130, origin PoP 140, one or more edge PoPs 150, and one or more client devices 160.

Encoder 110 may receive the source content, encode the source content into stream segments, and upload (at 1) the stream segments to publish PoP 120 of a CDN. Each segment may encode a short duration (e.g., 2-10 seconds) of the overall content as a separate file (e.g., a transport stream file). Publish PoP 120 may be the closest PoP (e.g., fewest network hops, least latency, etc.) of the CDN to encoder 110, thereby allowing encoder 110 to efficiently upload the stream segments into the CDN. However, publish PoP 120 may have limited storage, and storage 130 may be a central CDN repository where streams uploaded to different publish PoP 120 are made stored and made available for redistribution by edge PoPs 150.

Accordingly, publish PoP 120 may provide (at 2) the segments to storage 130. Publish PoP 120 may wait until all data for a segment is uploaded in order to generate the corresponding file and provide the generated file for the segment to storage 130. Thus, if a segment is three seconds in duration, it may take three seconds to generate the file containing the segment data, and additional time to upload (at 1) the segment/file to publish PoP 120, and publish PoP 120 to provide (at 2) the segment/file to storage 130.

Additional delay stems from client devices 160 pulling the stream segments from the CDN. As shown, client devices 160 may request (at 3) the stream segments from different edge PoPs 150 of the CDN that are closest or optimal for redistribution of the stream to those client devices 160. The initial set of requests from client devices 160 to edge PoPs 150 may result in cache misses at the edge PoPs 150 as servers operating within edge PoPs 150 have not yet obtained the requested stream segments.

In response to request that results in a cache miss, edge PoPs 150 may issue (at 4) requests for the stream segments to origin PoP 140, and origin PoP 140 may request (at 5) and retrieve (at 6) the uploaded stream segments or corresponding files from storage 130. Origin PoP 140 may distribute (at 7) the retrieved stream segments to edge PoPs 150 where client device 160 requests for those segments resulted in cache misses.

Upon receiving the stream segments from origin PoP 140, edge PoPs 150 may then redistribute (at 8) the stream segments to requesting client devices 160. Edge PoPs 150 may also locally cache a copy of the stream segments at one or more servers operating in edge PoPs 150 so that subsequent client device requests for those stream segments may be served directly from cache without additional retrieval delays to origin PoP 140 and/or storage 130.

As can be seen from FIG. 1, the total time to commence a stream using this pull-based methodology may be the full duration to encode a segment, latency associated with uploading (at 1) the segment from encoder 110 to publish PoP 120, latency associated with providing (at 2) the segment from publish PoP 120 to storage 130, and round-trip times ("RTTs") associated with client devices 160 requesting (at 3) and receiving (at 8) the stream segments from edge PoPs 150, edge PoPs 150 requesting (at 4) and receiving (at 7) the stream segments from origin PoP 140, and origin PoP 140 requesting (at 5) and receiving (at 6) the stream segments from storage 130. These delays can cause playback of the live stream to commence several seconds after a corresponding broadcast feed for the same content.

DETAILED DESCRIPTION

Systems and methods provide hybrid pull and push based streaming of live streams (e.g., of video, audio, text, images, etc.) and other content over the Internet and/or packet-switched networks. The hybrid pull and push based streaming may distribute content over the Internet and/or one or more packet-switched networks with equivalent or insignificant delay relative to a broadcast feed of the same content.

In some embodiments, the hybrid pull and push based streaming may be based on a simplified content delivery network ("CDN") architecture that provides low-latency pull-based distribution for low demand streams, and that transitions from the pull-based distribution to even lower latency push-based distribution for high demand streams. The push-based distribution may prepopulate the caches of different CDN points-of-presence ("PoPs") with stream segment data as the data associated with one or more frames of the segments are uploaded from an encoder to a single PoP of the CDN, and without the PoPs requesting those segments. Consequently, stream segment data may be distributed to different CDN PoPs as soon as the upload commences, and without waiting for an entire segment to be uploaded or a corresponding file for that segment to be generated. As a result of the push-based distribution, the PoPs may immediately respond to client device requests by serving requested segments directly from cache without cache misses, and without requesting and retrieving the segment data from another CDN PoP or elsewhere in or outside the CDN.

Figure 2:
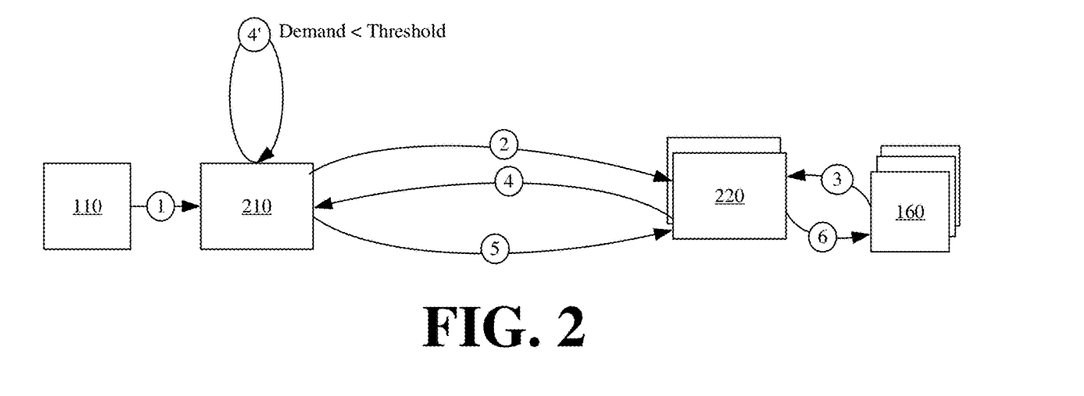
FIG. 2 conceptually illustrates the pull-based distribution of a low demand stream in accordance with some embodiments of the hybrid pull and push based streaming.

FIG. 2 conceptually illustrates using the simplified CDN architecture to perform the pull-based distribution in accordance with some embodiments of the hybrid pull and push based streaming. As shown, the simplified CDN architecture includes source PoP 210 and one or more distribution PoPs 220. Source PoP 210 and distribution PoPs 220 may perform similar, but different operations than publish PoP 120 and edge PoPs 150 (as shown in FIG. 1) when performing the pull-based distribution of a stream implemented herein as part of the hybrid pull and push based streaming. Moreover, in comparison to the CDN architecture of FIG. 1, the simplified CDN architecture of FIG. 2 removes storage 130 and origin PoP 140 from the pull-based distribution of a stream.

Encoder 110 may encode content or programming for a particular stream as different stream segments, and may upload (at 1) the data for those segments to source PoP 210 as the data is generated by encoder 110. Like publish PoP 120, source PoP 210 may be a CDN PoP that is closest to encoder 110. For instance, source PoP 210 and distribution PoPs 220 may be identified with the same address (e.g., Internet Protocol ("IP") address) or Uniform Resource Locator ("URL"). Anycast and/or Domain Name System ("DNS") servers or routers may receive an upload request to the shared PoP address from encoder 110, and may identify, based on addressing and/or location of encoder 110 or the DNS server, that source PoP 210 is an optimal PoP for encoder 110 (e.g., the CDN PoP with the fewest network hops, lowest latency, fastest performing, etc. for encoder 110).

Unlike publish PoP 120, source PoP 210 may directly store the particular stream data for redistribution to client devices 160 and/or other distribution PoPs 220. The simplified CDN architecture of FIG. 2 does not use a central repository (e.g., storage 130 or origin PoP 140) to store streams.

In some embodiments, encoder 110 may upload (at 1) the data for encoded segments via a sequence of HyperText Transfer Protocol ("HTTP") POST, PUT, or GET messages. Other messaging formats may also be used to upload the segment data to source PoP 210. Encoder 110 may perform a chunk-by-chunk, byte-by-byte, frame-by-frame, or segment-by-segment upload of a stream to source PoP 210. Source PoP 210 may include one or more servers with memory and/or storage that locally cache the segment data. To reduce memory or storage requirements when adapting a CDN PoP to operate as source PoP 210, some embodiments limit the amount of a stream that is cached by source PoP 210 at any given moment. For instance, source PoP 210 may store the last two minutes of a stream, and discard older segments.

Source PoP 210 may notify (at 2) distribution PoPs 220 that the particular stream is available at source PoP 210 for redistribution. For instance, source PoP 210 may broadcast or otherwise send a message to distribution PoPs 220 upon encoder 110 commencing the upload of the segment data for the particular stream to source PoP 210. The message may include information for accessing the particular stream from source PoP 210. For instance, the message may include a URL, identifier, and/or address that distribution PoPs 220 may use to retrieve data for the particular stream from source PoP 210. Distribution PoPs 220 dynamically adapt their operation based on the notifications from various source PoPs 210, and do not statically retrieve all streams from an origin PoP 140 or storage 130 as shown in FIG. 1.

Client device 160 may issue (at 3) a request for a segment of the particular stream to distribution PoP 220. The request may be an HTTP GET request with a URL that is directed to the segment of the particular stream.

The request may result in a cache miss at distribution PoP 220, because distribution PoP 220 does not have a local or cached copy of the requested segment. In response to the cache miss and the notification (at 2) from source PoP 210, distribution PoP 220 issues (at 4) a request for the segment of the particular stream directly to source PoP 210.

Source PoP 210 may monitor (at 4') a request rate and/or request count for the particular stream from distribution PoP 220 (as well as from other distribution PoPs), and may determine that the request rate and/or request count for the particular stream from distribution PoP 210 does not exceed a push-based distribution threshold. Accordingly, source PoP 210 provides (at 5) data for the segment to distribution PoP 220 in response to the issued (at 4) request. In some embodiments in which encoder 110 is uploading data for the requested segment to source PoP 210 when the issued (at 4) request is received by source PoP 210, source PoP 210 may respond to the request by providing any data that has already been uploaded without waiting for the upload of all data for the requested segment to complete. In other words, source PoP 210 may perform a chunked transfer of the data it has received to distribution PoP 220.

Distribution PoP 220 may then provide (at 6) the data, available in part or full pertaining to the requested segment, to client device 160. Distribution PoP 220 may also locally cache data for the retrieved segment in order to respond to subsequent requests from other client devices 160 for the same segment.

The benefits of the simplified CDN architecture and the low latency pull-based distribution of the particular stream implemented using the simplified CDN architecture can be seen relative to the prior art pull-based methodology of FIG. 1. For instance, the pull-based distribution using the simplified CDN architecture of FIG. 2 eliminates the delay associated with waiting the full duration of a segment in order to receive all data for that segment before the corresponding file is generated and pushed to storage 130. The pull-based distribution via the simplified CDN architecture of FIG. 2 also eliminates the delay associated with the cache miss and the round-trip time ("RTT") between origin PoP 140 and storage 130.

The pull-based distribution illustrated in FIG. 2 is one part of the hybrid pull and push based streaming that is used to distribute streams with low demand across the CDN. The hybrid pull and push based streaming may also selectively transition the distribution of one or more streams from source PoP 210 to one or more distribution PoPs 220 from the pull-based distribution of FIG. 2 to a push-based distribution. The push-based distribution may be used to distribute streams with high demand across the CDN. The push-based distribution prepopulates the cache of a distribution PoP 220 with stream segment data as the stream segment data is uploaded to source PoP 210 and before distribution PoP 220 requests the stream segment data from source PoP 210. Streams that are prepopulated in distribution PoP 220 cache using the push-based distribution are available for immediate redistribution from distribution PoP 220 to client devices 160.

Prepopulating the cache of a distribution PoP 220 via the push-based distribution significantly reduces the latency and/or delay from when client device 160 requests a stream segment to when client device 160 receives the stream segment. In particular, client device 160 requests can be immediately served from distribution PoP 220 cache without a cache miss or retrieval operation outside distribution PoP 220. The reduced latency improves the user experience by reducing the time to start playback of a stream, and by increasing quality of the stream. The push-based distribution may consume greater bandwidth because stream segments are pushed whether or not they are requested, and may therefore be selected for distributing streams that are in high demand (e.g., requested by a large number of client devices 160).

Figure 3A:
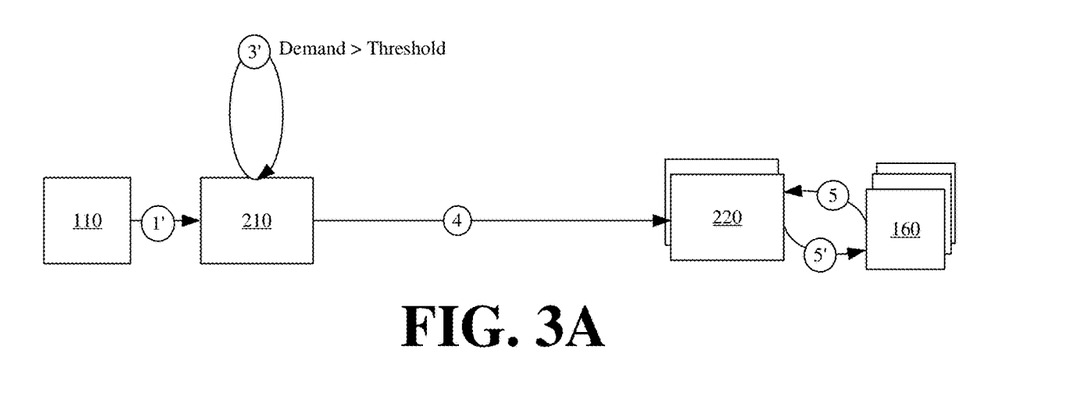
FIG. 3A conceptually illustrates the push-based distribution of a high demand stream in accordance with some embodiments of the hybrid pull and push based streaming.

FIG. 3A conceptually illustrates the push-based distribution of a high demand stream in accordance with some embodiments of the hybrid pull and push based streaming. FIG. 3A may be based on or continue from FIG. 2. For instance, encoder 110 may upload and/or continue (at 1') uploading encoded data for segments of the particular stream to source PoP 210 with source PoP 210 having previously notified distribution PoPs 220 of the availability of the particular stream at source PoP 210.

After some number of client device 160 requests for the particular stream issued (at 3 from FIG. 2) to distribution PoP 220, source PoP 210 may determine (at 3') that demand for the particular stream from distribution PoP 220 exceeds a push-based distribution threshold. The push-based distribution threshold may be a set threshold, or a configurable threshold that changes based on the stream, stream providers, time of day, available resources, etc. Source PoP 210 may determine the demand for the particular stream from distribution PoP 220 by monitoring the request rate or request count for the particular stream coming from distribution PoP 220 over some interval of time. Distribution PoP 220 may issue a request for a segment of the particular stream to source PoP 210 each time a client device 160 requests a segment and/or data of the particular stream from distribution PoP 220, and the request results in a cache miss. Distribution PoP 220 may cache segment data once it is received from source PoP 210. However, before source PoP 210 sends the segment data to distribution PoP 220 (and before performing the push-based distribution), distribution PoP 220 may receive requests for the same segment data from different client devices 160 with each request resulting in a cache miss and another request to source PoP 210.

In response to determining (at 3') that the demand from distribution PoP 220 exceeds the threshold, source PoP 210 may transition from the pull-based distribution of the particular stream to distribution PoP 220, illustrated in FIG. 2 above, to a push-based distribution of the particular stream to distribution PoP 220. Specifically, in response to determining (at 3') that the demand from distribution PoP 220 exceeds the threshold, source PoP 210 may immediately push (at 4) data for segments of the particular stream to distribution PoP 220 as source PoP 210 receives the data from encoder 110. In other words, source PoP 210 prepopulates the cache of distribution PoP 220 with the particular stream data prior to distribution PoP 220 submitting any requests for that data or the segments that encode the data. To push the data, source PoP 210 may simply forward the HTTP POST, PUT, or GET messages from encoder 110 to distribution PoP 220. Alternatively, source PoP 210 may generate new messages that contain the data for the particular stream uploaded by encoder 110, and may pass those messages to distribution PoP 220. Accordingly source PoP 210 may perform a chunked transfer of stream segment data to distribution PoP 220.

Distribution PoP 220 may cache the pushed data for the particular stream in memory and/or storage of one or more servers operating in distribution PoP 220. Thereafter, as client devices 160 issue (at 5) requests for segments that encode the pushed data, distribution PoP 220 may immediately respond (at 5') to those requests, without a cache miss or retrieval operation, by providing the data for those segments that was previously pushed (at 4) into distribution PoP 220 cache by source PoP 210.

In performing the push-based distribution, source PoP 210 may push data for a defined number of segments of the particular stream to distribution PoP 220, or may push the particular stream data to distribution PoP 220 as the data is uploaded by encoder 110 for a defined amount of time. After pushing data for the defined number of segments or pushing stream data for the defined amount of time, source PoP 210 may stop or pause the push-based distribution of the particular stream to distribution PoP 220 to determine if the demand from distribution PoP 220 continues to exceed the threshold. If the demand continues to exceed the threshold, source PoP 210 may continue to perform the push-based distribution. If the demand does not exceed the threshold, remaining segments for the particular stream may be distributed from source PoP 210 to distribution PoP 220 using the pull-based distribution.

As can be seen from FIGS. 2 and 3A, the push-based distribution eliminates one half of the RTT between source PoP 210 and distribution PoP 220, because distribution PoP 220 no longer has to request each segment or segment data from source PoP 210 when source PoP 210 pushes one or more segments or the segment data to distribution PoP 220. Moreover, the push-based distribution eliminates the potential of a request from client device 160 resulting in a cache miss at distribution PoP 220. Consequently, distribution PoP 220 may avoid several hundreds of milliseconds of delay that may otherwise be incurred when retrieving a stream segment or other content in response to a cache miss.

In some embodiments, the demand from a single distribution PoP 220 may trigger the push-based distribution for two or more distribution PoPs 220. For instance, the demand for a particular stream from a first distribution PoP may cause source PoP 210 to push the particular stream data to the first distribution PoP and one or more other distribution PoPs. In some other embodiments, the aggregate demand for a particular stream at source PoP 210 from two or more distribution PoPs 220 may trigger the push-based distribution of the particular stream data from source PoP 210 to the two or more distribution PoPs 220.

Figure 3B:
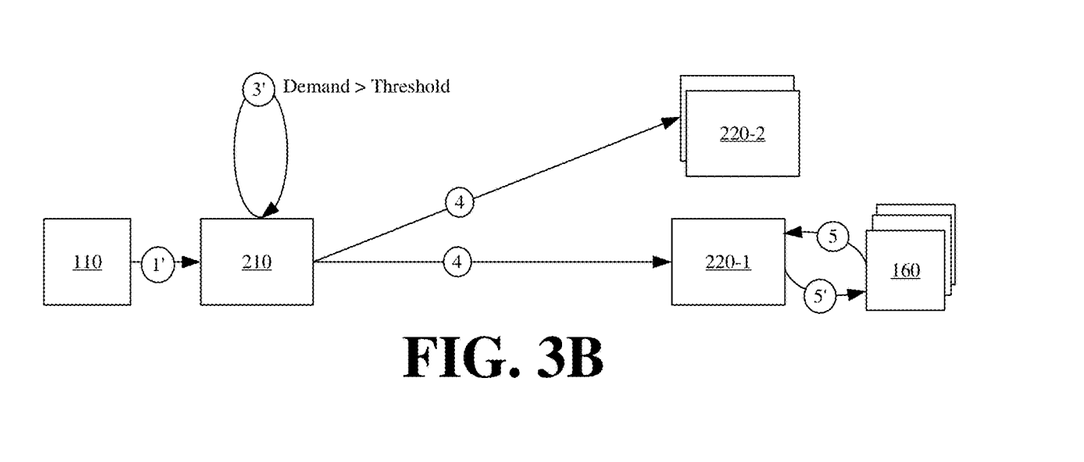
FIG. 3B conceptually illustrates initiating the push-based distribution of a high demand stream to multiple distribution points-of-presence ("PoPs") in accordance with some embodiments of the hybrid pull and push based streaming.

FIG. 3B conceptually illustrates initiating the push-based distribution of a high demand stream to multiple distribution PoPs 220-1 and 220-2 (herein sometimes collectively referred to as "distribution PoPs 220" or individually as "distribution PoP 220") in accordance with some embodiments of the hybrid pull and push based streaming. In this figure, source PoP 210 may determine (at 3') that the demand for the particular stream being uploaded by encoder 110 exceeds one or more thresholds. The demand may be derived based on request rates and/or request counts from a single distribution PoP 220-1 or 220-2, or an aggregate request rate and/or request count from distribution PoPs 220-1 and 220-2.

For instance, the particular stream may be a stream for a global event that is likely to be watched from different distribution PoPs 220. Accordingly, as soon as source PoP 210 determines (at 3') that the request rate for the particular stream from one of distribution PoPs 220-1 or 220-2 exceeds a threshold, source PoP 210 may push (at 4) the particular stream to two or more distribution PoPs 220-1 and 220-2, rather than wait for the request rate from each distribution PoP 220-1 and 220-2 to separately exceed the threshold.

Alternatively, source PoP 210 may determine (at 3') that the aggregate request rate and/or request count for the particular stream from distribution PoPs 220-1 and 220-2 exceeds a global threshold. Once demand for the particular stream exceeds the global threshold, source PoP 210 may push (at 4) the data for the particular stream to distribution PoPs 220-1 and 220-2 and/or other distribution PoPs 220.

Thereafter, when client device 160 submits (at 5) a request for a segment of the particular stream to distribution PoP 220-1, distribution PoP 220-1 may immediately provide (at 5') the requested segment from cache without a cache miss or performing a time-consuming pull-based retrieval of the requested segment from elsewhere within or outside the CDN.

In some embodiments, source PoP 210 may initiate and/or perform the push-based distribution of two or more streams to a particular distribution PoP 220 when aggregate demand for the two or more streams from the particular distribution PoP 220 exceeds a PoP threshold. In some embodiments, source PoP 210 may initiate and/or perform the push-based distribution of two or more streams to a particular distribution PoP 220 when demand for one of the two or more streams from the particular distribution PoP 220 exceeds a threshold. In some embodiments, source PoP 210 may initiate and/or perform the push-based distribution of one or more streams to two or more distribution PoPs 220 when aggregate demand for the one or more streams from the two or more distribution PoPs 220 exceeds a threshold. Thus, source PoP 210 may use different thresholds based on different request rates and/or request counts to transition the hybrid pull and push based streaming from the pull-based distribution to the push-based distribution.

In some embodiments, the push-based distribution may be initiated and/or performed for a particular stream without demand for that particular stream exceeding any thresholds. In some such embodiments, source PoP 210 may preemptively perform the push-based distribution based on an expectation that the particular stream will receive excess demand at one or more distribution PoPs 220, or because the stream provider has paid for faster delivery of the particular stream.

Figure 4:
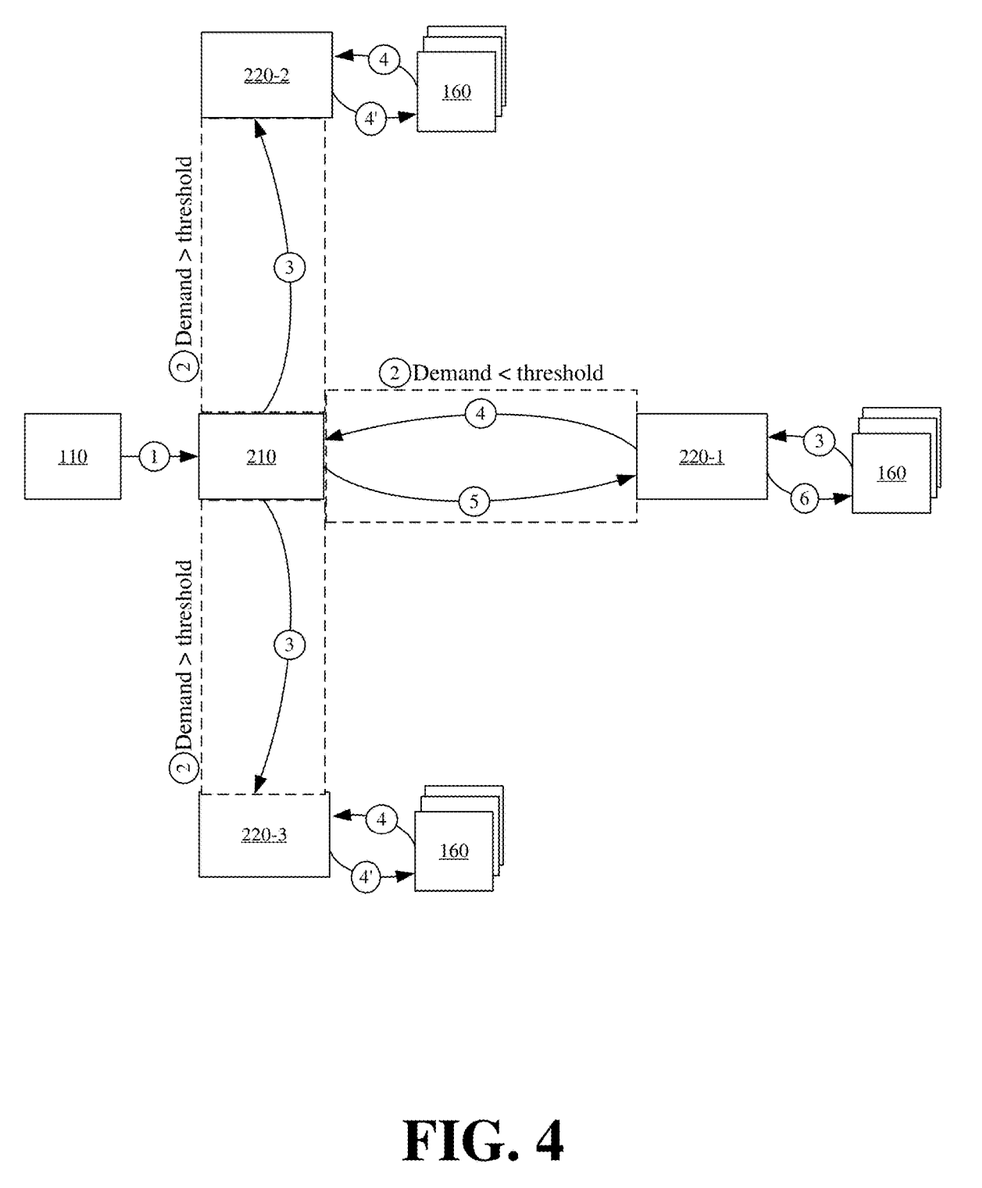
FIG. 4 conceptually illustrates a source PoP performing pull-based distribution of a stream to a first distribution PoP, and push-based distribution of the same stream to second and third distribution PoPs.

The hybrid pull and push based streaming allows source PoP 210 to selectively perform the pull-based distribution of a stream for some distribution PoPs 220, and the push-based distribution of the same stream for the same distribution PoPs 220 at different times, or other distribution PoPs 220 at the same or different times. FIG. 4 conceptually illustrates source PoP 210 providing pull-based distribution of a stream to distribution PoP 220-1, and push-based distribution of the same stream to distribution PoPs 220-2 and 220-3 based on different demands for the stream from distribution PoPs 220-1, 220-2, and 220-3.

As shown, source PoP 210 separately monitors (at 2) the demand for the stream from each distribution PoP 220-1, 220-2, and 220-3. From monitoring (at 2) the demand, source PoP 210 determines that the demand for the stream from distribution PoP 220-1 does not exceed a push-based distribution threshold, and that the demand for the stream from each of distribution PoPs 220-2 and 220-3 does exceed the push-based distribution threshold. The difference in demand at distribution PoPs 220-1, 220-2, and 220-3 may be due to different numbers of client devices 160 simultaneously or concurrently requesting the stream from each distribution PoP 220-1, 220-2, and 220-3. Such difference in demand at different distribution PoPs 220-1, 220-2, and 220-3 may be common for regional events (e.g., regional sports teams, airing of the same stream at different times for different time zones or regions, and/or other news, events, programming, or content that is of regional interest).

Based on low demand for the stream from distribution PoP 220-1, source PoP 210 does not automatically push the stream data to distribution PoP 220-1 in order to prepopulate the cache of distribution PoP 220-1 with the stream data. Rather, source PoP 210 relies on the pull-based distribution in which distribution PoP 220-1 requests (at 4) specific segments and/or segment data directly from source PoP 210 in response to client device 160 requests (at 3) that result in cache misses at distribution PoP 220-1. In response to requests (at 4) from distribution PoP 220-1, source PoP 210 provides (at 5) the requested segments and/or segment data to distribution PoP 220-1, and distribution PoP 220-1 may then respond to the requests from client devices 160 that resulted in the cache misses, and provide (at 6) the requested segments.

Based on the high demand for the stream from distribution PoPs 220-2 and 220-3, source PoP 210 automatically pushes (at 3) the stream data to distribution PoPs 220-2 and 220-3. By pushing the stream data, source PoP 210 prepopulates caches of distribution PoPs 220-2 and 220-3 with the stream data as encoder 110 uploads the stream data to source PoP 210, and before the stream data is requested from source PoP 210 by distribution PoPs 220-2 and 220-3. Accordingly, the stream data is available sooner for redistribution at distribution PoPs 220-2 and 220-3 (e.g., after operation 3) than at distribution PoP 220-1 (e.g., after operation 5). Thus, when distribution PoPs 220-2 and 220-3 receive requests (at 4) for stream segments and/or segment data, distribution PoPs 220-2 and 220-3 can immediately respond to those requests by providing (at 4') the segments and/or segment data from local memory or storage without a cache miss or retrieval from outside distribution PoP 220-2 or distribution PoP 220-3.

Figure 5:
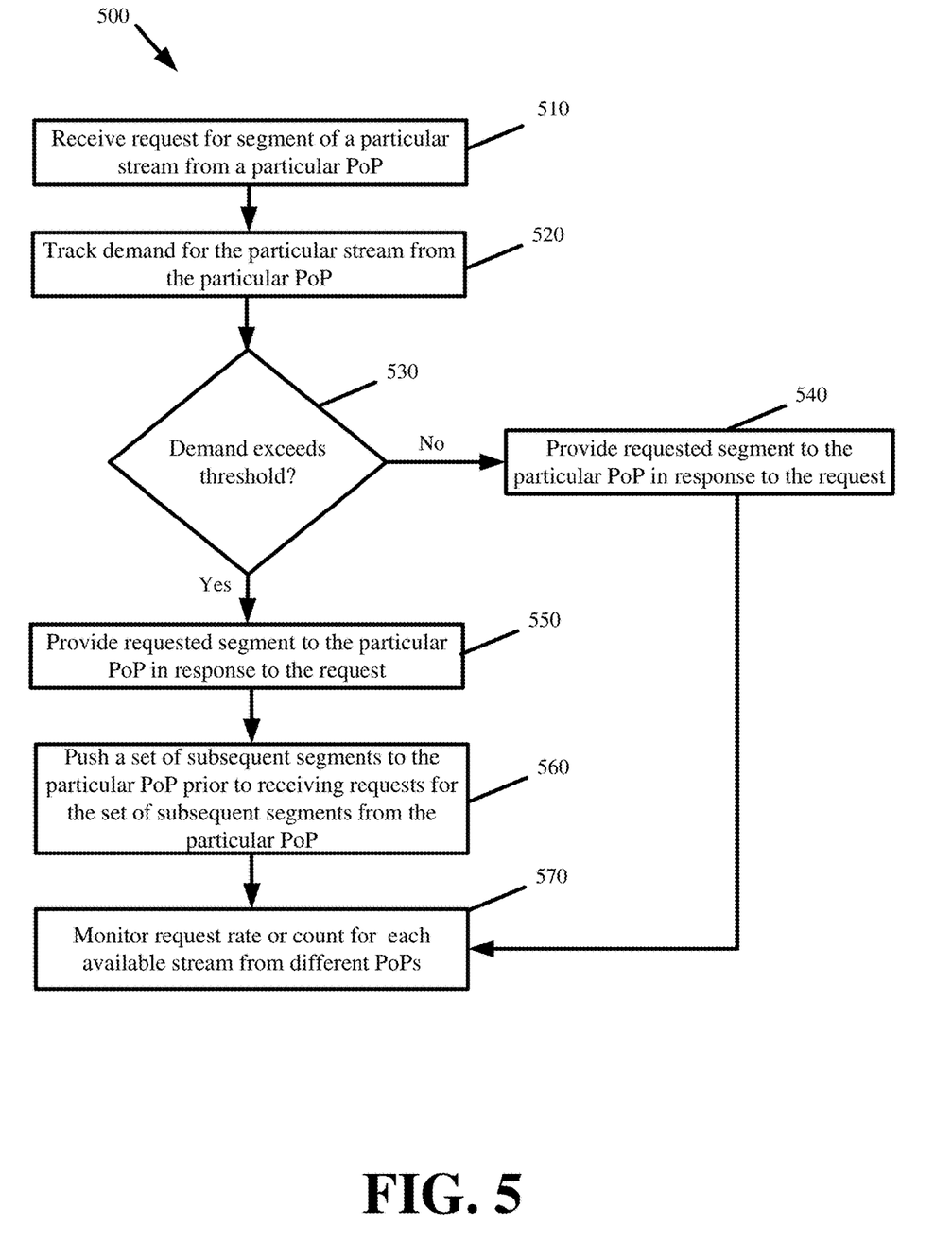
FIG. 5 presents process for performing the hybrid pull and push based streaming in accordance with some embodiments.

FIG. 5 presents process 500 for performing the hybrid pull and push based streaming in accordance with some embodiments. Process 500 may be performed by source PoP 210, which could be any PoP of the CDN that receives a stream from encoder 110 for redistribution by the CDN. Specifically, process 500 may be performed by one or more servers of source PoP 210 that directly receives and redistributes the stream from encoder 110 to other distribution PoPs 220 and/or client devices 160.

Process 500 may include receiving (at 510) at source PoP 210, a request for a segment of a particular stream from distribution PoP 220. The request may specify a URL that identifies the name or other identifier for the particular stream, and the specific segment being requested.

Process 500 may include tracking (at 520) demand for the particular stream from distribution PoP 220. Source PoP 210 may track (at 520) demand using an internally stored table or other data structure. The table may identify a request rate and/or a request count from each distribution PoP 220 and for each stream that is uploaded to source PoP 220. The table may be updated every time source PoP 210 receives a request (at 510) for a segment and/or data of a stream that is uploaded to source PoP 210.

Figure 6:
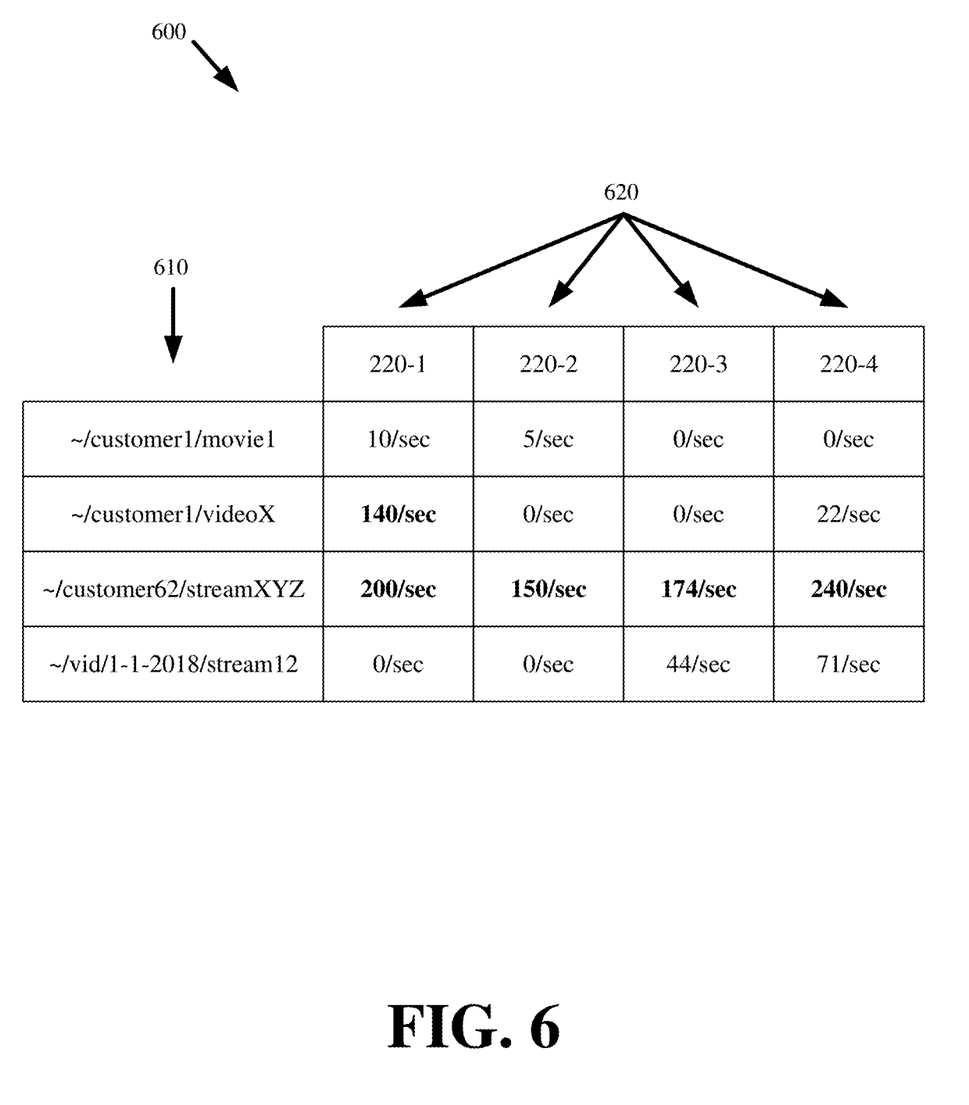
FIG. 6 provides an example table that may be used by a source PoP for tracking demand from different distribution PoPs for different streams uploaded to the source PoP.

FIG. 6 provides an example table 600 that may be used by source PoP 210 for tracking demand from different distribution PoPs 220-1, 220-2, 220-3, and 220-4 for different streams uploaded to source PoP 210. Table 600 may include first entry 610 identifying a stream and set of second entries 620 identifying demand for the stream from different distribution PoPs 220-1, 220-2, 220-3, and 220-4.

First entry 610 may specify a stream name, URL, and/or other identifier for the stream. A different first entry 610 may be provided for different bitrates of the same stream in order to track demand for each bitrate separately.

Second entries 620 may track the request rate and/or request count for the particular stream from each distribution PoP 220-1, 220-2, 220-3, and 220-4. Each individual entry from second entries 620 may be used to track demand for a particular stream on a per distribution PoP 220 basis. Source PoP 210 may also track demand by aggregating two or more of second entries 220 in order to aggregate request rates and/or request counts for a particular stream from two or more of distribution PoPs 220-1, 220-2, 220-3, and 220-4, or in order to aggregate request rates and/or request counts for two or more streams from one or more of distribution PoPs 220-1, 220-2, 220-3, and 220-4.

With reference back to FIG. 5, process 500 may include determining (at 530) whether the demand tracked (at 520) for the particular stream from distribution PoP 220 exceeds one or more thresholds. For instance, source PoP 210 may determine whether the demand for the particular stream from distribution PoP 220 exceeds a first threshold, and whether the aggregate demand for the particular stream from two or more distribution PoPs 220 exceeds a second threshold.

In response to determining (at 530—No) that the demand does not exceed the one or more thresholds, process 500 may include providing (at 540) data for the requested segment to distribution PoP 220 in response to the received (at 510) request via the pull-based distribution of the hybrid pull and push based streaming. For instance, the request may be an HTTP GET message, and the requested segment may be provided as part of an HTTP RESPONSE message with a body containing the segment data or the transport stream file that encodes the requested segment.

In response to determining (at 530—Yes) that the demand does exceed the one or more thresholds, process 500 may include providing (at 550) data for the requested segment to distribution PoP 220 in response to the received (at 510) request via the pull-based distribution of the hybrid pull and push based streaming, and also pushing (at 560) to distribution PoP 220, via the push-based distribution of the hybrid pull and push based streaming, data for a subsequent set of segments of the particular stream that follow the requested segment and that have not been requested by distribution PoP 220. In some embodiments, source PoP 210 may push data for the subsequent set of segments to distribution PoP 220 as source PoP 210 receives the data for those segments from encoder 110. In some embodiments, source PoP 210 may push the data for the subsequent set of segments to distribution PoP 220 via a set of HTTP POST, PUT, and/or GET messages that source PoP 210 generates, that contain the segment data, and that are addressed and sent to distribution PoP 220. Source PoP 210 may stop pushing the particular stream segments to distribution PoP 220 after data for a specified number of segments (e.g., fifty segments) have been sent via the push-based distribution, or after some amount of time (e.g., twenty seconds) has passed since initiating the push-based distribution.

Process 500 may then include monitoring (at 570) the demand (e.g., request rate and/or request count) from each distribution PoP for each stream that is uploaded to source PoP 210. The monitoring (at 570) allows source PoP 210 to determine when to initiate and/or stop push-based distribution for different streams.

Source PoP 210 may continually update the demand tracking table (e.g., table 600) as part of monitoring the request rate and/or request count. The table may grow over time as new streams are uploaded to source PoP 210 and demand for older streams subsides. To limit the table size, source PoP 210 may prune the table to remove streams that are no longer being uploaded by encoder 110, remove streams that are no longer cached by source PoP 210, and/or remove streams where the request rate or request count has fallen below a threshold value or has been zero for some period of time. For instance, a live stream that lasts one hour may receive zero or only a few requests after live stream completes (e.g., one hour after a first segment was uploaded to source PoP 210). Source PoP 210 can determine that the demand for the live stream is below a threshold, or determine that the live stream has ended as a result of an encoder no longer uploading segments for that live stream. Source PoP 210 may then remove one or more entries for the live stream from the demand tracking table.

In some embodiments, the table may be updated based on a Least Recently Used ("LRU") tracking of the streams. Each time source PoP 210 receives a request for a particular stream from any distribution PoP 220, source PoP 210 may increment the request count for the particular stream in the table, and identify that the corresponding entry has been updated. For instance, each time an entry for the particular stream is updated, that entry may be moved to the top of the table. Alternatively, each entry may have a timestamp that identifies the last time the entry was updated. Periodically, source PoP 210 may remove one or more entries that have not been recently updated, or that are at the bottom of the table.

Figure 7:
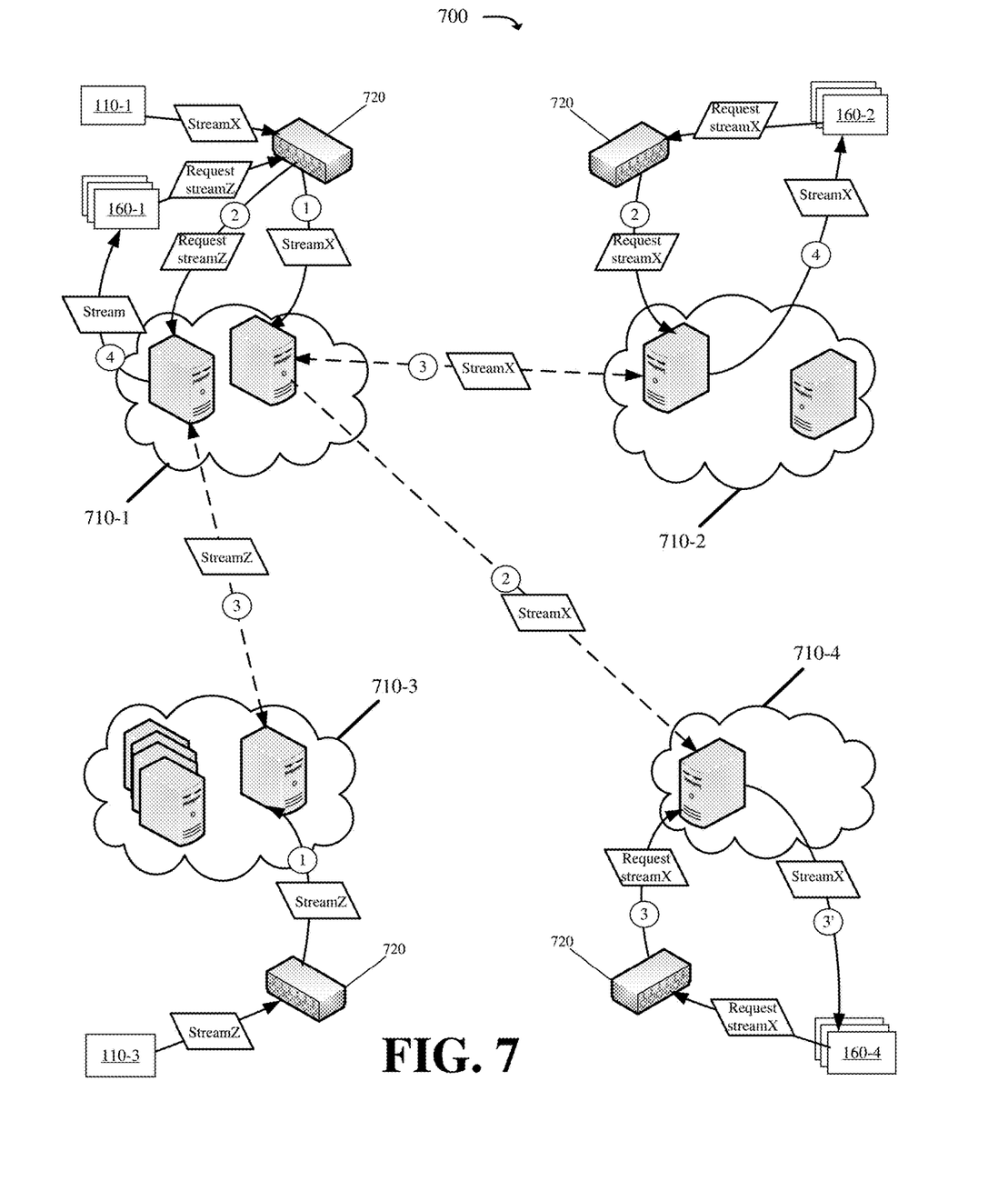
FIG. 7 presents an example environment for implementing the hybrid pull and push based streaming in accordance with some embodiments.

FIG. 7 presents example environment 700 for implementing the hybrid pull and push based streaming in accordance with some embodiments. Environment 700 may represent the operating infrastructure or architecture of any distributed platform that provides over-the-top ("OTT"), Internet-based, and/or other packet-switched network delivery of content and media streams, including live and/or linear streams to client devices 160 at different geographic locations. For instance, environment 700 may represent a CDN or other distributed cloud system for content distribution.

Environment 700 may include different PoPs 710-1, 710-2, 710-3, and 710-4 (herein sometimes collectively referred to as "PoPs 710" or individually as "PoP 710"), that are located at different edges of the Internet or other large network. PoPs 710 may be geographically separated from one another. Each PoP 710 may interchangeably and/or concurrently operate as source PoP 210 and/or distribution PoP 220. For instance, PoP 710-1 is shown to operate as source PoP 210 for a first stream uploaded by encoder 110-1, and distribution PoP 220 for a second stream requested by client device 160-1.

Each PoP 710 may include one or more servers. The servers may be streaming devices that intake uploaded streams from encoders 110, and make the streams available for redistribution across PoPs 710. The servers may also receive and respond to client device 160 requests for streams that have been uploaded to at least one PoP 710 of the distributed platform by performing the hybrid pull and push based streaming in accordance with some embodiments. Each PoP 710 may also include other devices such as load balancers, routers, switches, etc. (not shown).

The servers of each PoP 710 can be separate physical machines, or a set of virtual machines running on a partitioned or shared set of resources of one or more physical machines. Servers include at least a processor, network connectivity, memory, and/or storage. Additional components of the servers are described with respect to FIG. 10 below.

Each PoP 710 may operate as source PoP 210 for the hybrid pull and push based streaming when receiving a stream or other content for redistribution to client devices 160 and/or other PoPs 710. In such cases, one or more servers of PoP 710 may establish a network connection to an encoder (e.g., encoder 110-1 or 110-3), and may receive POST, PUT, GET, and/or other messages when the encoder uploads stream segment data to the one or more servers. For instance, encoder 110-1 may provide a URL identifying a stream and/or segments for upload. A director or load balancer within PoP 710-1 may hash the URL in order to select a specific server within PoP 710-1 to receive data for some or all segments for the stream from encoder 110-1. In this manner, multiple segments for a particular stream may be uploaded to the same server of PoP 710-1. In some embodiments, the encoders may be authenticated before being permitted to upload stream segment data or other content into the distributed platform (e.g., one or PoPs 710). One or more servers also include memory and/or storage that can be used to store the uploaded stream segment data. For live streams, the one or more servers may cache the last few minutes of uploaded stream segment data while removing or overwriting older stream segment data.

Once the upload of a stream to a server within PoP 710 commences, the server may notify other PoPs 710 of availability of the stream. For instance, the server within PoP 710-1 receiving the first stream from encoder 110-1 may use a flood message that broadcasts the first stream name, identifier, URL, and/or other accessibility information to PoPs 710-2, 710-3, and 710-4. PoPs 710-2, 710-3, and 710-4 may then distribute the flood message to each server that operates within PoPs 710-2, 710-3, and 710-4, or may update a table or other data structure that the servers operating in each PoP 710 may reference in order to identify the source PoP for a given stream. Alternatively, the server may address and send a message containing the first stream name, identifier, URL, and/or other accessibility information to each PoP 710-2, 710-3, and 710-4.

In FIG. 7, PoPs 710-1 and 710-3 are shown to operate as source PoPs 210 for two different streams. In particular, a server in PoP 710-1 receives segment data for a first stream from encoder 110-1, and a different server in PoP 710-3 receives segment data for a second stream from encoder 110-3. The servers may store the segment data, distribute messaging to notify other servers or PoPs 710 of the stream availability, and/or perform the hybrid pull and push based streaming to redistribute the segment data to other servers or PoPs 710.

Each PoP 710 may interchangeably or concurrently operate as distribution PoP 220 for the hybrid pull and push streaming when receiving a request from a client device 160 for a segment or segment data of a stream that is being uploaded or that has been uploaded to one of PoPs 710. In such cases, the request may include a URL for the requested segment. Once again, a director or load balancer at PoP 710 may receive the request, hash the request URL, and select a specific server operating within PoP 710 to respond to client device 160 requests for the same segment or stream. Accordingly, all requests from the same stream or stream segment may be routed to the same server so that a single cached instance of the stream segment by that server can be used to respond to all requests for that stream segment without redundantly caching the stream segment in a single PoP 710, and without different servers retrieving the same segment from source PoP 210.

The selected server may respond to a client request for a stream segment that is not locally cache by identifying which PoP 710 is the source PoP 210 for that stream based on the notifications sent from each PoP 710. The selected server may then request the segment from the identified source PoP 210, receive the segment, cache the segment, and distribute the segment to the requesting client device 160. The server is also configured to cache segments that source PoP 210 may push in response to demand exceeding the push-based distribution threshold. The server may also run various processes to manage what content is cached, how content is cached, and the duration the content is cached.

In FIG. 7, PoPs 710-1, 710-2, and 710-4 are shown to operate as distribution PoPs 220 for a first stream uploaded to and accessible from PoP 710-1, and/or a second stream uploaded to and accessible from PoP 710-3. In particular, a server in PoP 710-1 receives a request from client device 160-1 for a segment of the second stream uploaded to PoP 710-3. The pull-based distribution of the hybrid pull and push based streaming may be used to provide data for the second stream from a server of PoP 710-3 to the requesting server of PoP 710-1, and then to client device 160-1. The pull-based distribution may also be used to provide data for the first stream from a server of PoP 710-1 to a server of PoP 710-2 so that the server of PoP 710-2 may provide the first stream to client device 160-2. The push-based distribution of the hybrid pull and push based streaming may also be used to provide data for the first stream from a server of PoP 710-1 to a server of PoP 710-4 when demand for the first stream from PoP 710-4 is determined to exceed one or more thresholds. Accordingly, data for the first stream may be prepopulated in cache at PoP 710-4 to allow a server in PoP 710-4 to immediately respond to requests for the first stream from client devices 160-4 from the cache.

Environment 700 may also include traffic management devices 720. Traffic management devices 720 may route client devices 160 and encoders 110 to an optimal PoP 710. More specifically, traffic management devices 720 may route requests issued by client devices 160 and uploaded stream segment data from encoders 110 to one of PoPs 710 that can optimally deliver the requested content back to requesting client device 160 and/or optimally ingest the stream segments from encoders 110. An optimal PoP may be selected, based on geographic proximity, network congestion, available resources, and/or other factors, to provide fastest delivery of the requested content to client devices 160 relative to other PoPs 710, and/or ingest the uploaded stream segments from encoders 110 with the least latency and errors.

Different implementations utilize different traffic management schemes, such as Anycast routing or Domain Name System (DNS) routing, to select an optimal PoP 710 for different encoders 110 and client devices 160, and to route messaging from encoders 110 and client devices 160 to an optimal PoP 710. Accordingly, traffic management devices 120 can include different combinations of Domain Name System (DNS) servers, load balancers, and routers performing Anycast, Border Gateway Protocol (BGP), and/or other routing of requests and data packets.

Client devices 160 may include any network-enabled device that can communicate with other devices via the Internet or any packet-switched network. In some implementations, client devices 160 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a desktop computer, a laptop computer, a tablet computer, an IoT device, a wearable device, and/or other network-enabled computing device.

Figure 8:
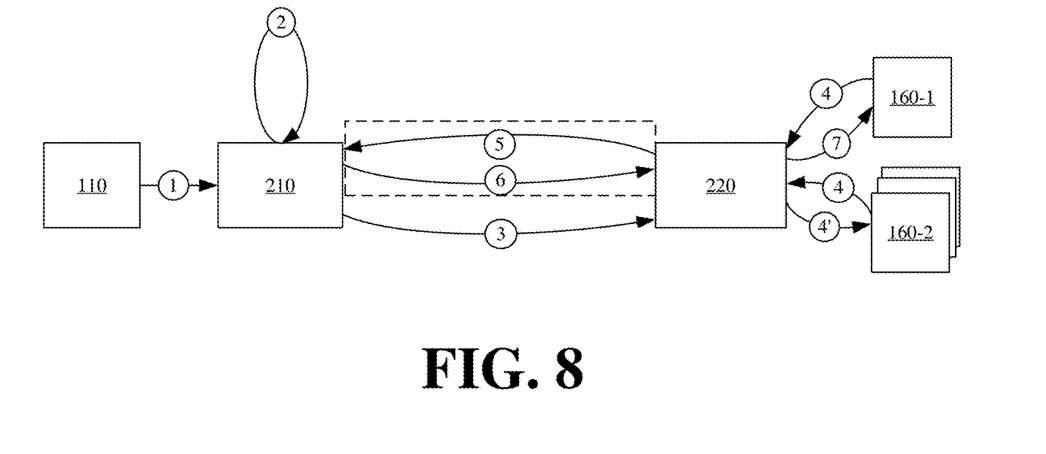
FIG. 8 illustrates an example of a source PoP performing different distributions for different bitrates of the same stream to a distribution PoP in accordance with some embodiments.

In some embodiments, the hybrid pull and push based streaming may be performed for different bitrates of the same stream. FIG. 8 illustrates an example of source PoP 210 performing different distributions for different bitrates of the same stream to distribution PoP 220 in accordance with some embodiments.

Encoder 110 may upload (at 1) a stream at different bitrates to source PoP 210. The different bitrates provide different quality encodings of the stream with smaller bitrates consuming less bandwidth during delivery/distribution and providing a lower quality rendering of the stream, and with larger bitrates consuming more bandwidth during delivery/distribution and provider a higher quality rendering of the stream. Adaptive streaming allows client devices 160-1 and 160-2 to switch between the different bitrates during playback to adjust quality for changing resources and network performance.

Source PoP 210 may monitor the demand from distribution PoP 220 for each bitrate, and may determine (at 2) that demand from distribution PoP 220 for a first bitrate of the stream does not exceed a push-based distribution threshold, and that demand from distribution PoP 220 for a second bitrate of the stream does exceed the push-based distribution threshold. Accordingly, the first bitrate may be distributed via the pull-based distribution of the hybrid pull and push based streaming, whereas the second bitrate may be distributed via the push-based distribution of the hybrid pull and push based streaming.

For instance, distribution PoP 220 may issue (at 5) a request for a segment at the first bitrate to source PoP 210 in response to receiving (at 4) a client device 160-1 request for the segment at the first bitrate. Source PoP 210 may provide (at 6) data for the requested segment at the first bitrate to distribution PoP 220, and distribution PoP 220 may then provide (at 7) the segment data encoded at the first bitrate to client device 160-1.

However, for the second bitrate, source PoP 210 may immediately push (at 3) segment data encoded at the second bitrate to distribution PoP 220 without distribution PoP 220 requesting the segments at the second bitrate from source PoP 210. When client device 160-2 requests (at 4) a segment at the second bitrate from distribution PoP 220, distribution PoP 220 may immediately respond to the request by obtaining the requested segment data encoded at the second bitrate from local cache, and by providing (at 4') data for the requested segment to client device 160-2 with less delay and/or latency than the pull-based distribution of the segments at the first bitrate.

The scenario illustrated by FIG. 8 may occur for an OTT streaming service. For instance, a majority of client devices 160 may request and watch the stream at 1920×1080 high-definition resolution. Accordingly, the push-based distribution may be used to distribute this primary stream (e.g., the 1920×1080 stream). There may be some client devices 160 that request and watch the stream at a lower resolution because of device restrictions and/or network congestion. For these client devices 160, the pull-based distribution of the lower resolution stream may be preferred.

Figure 9:
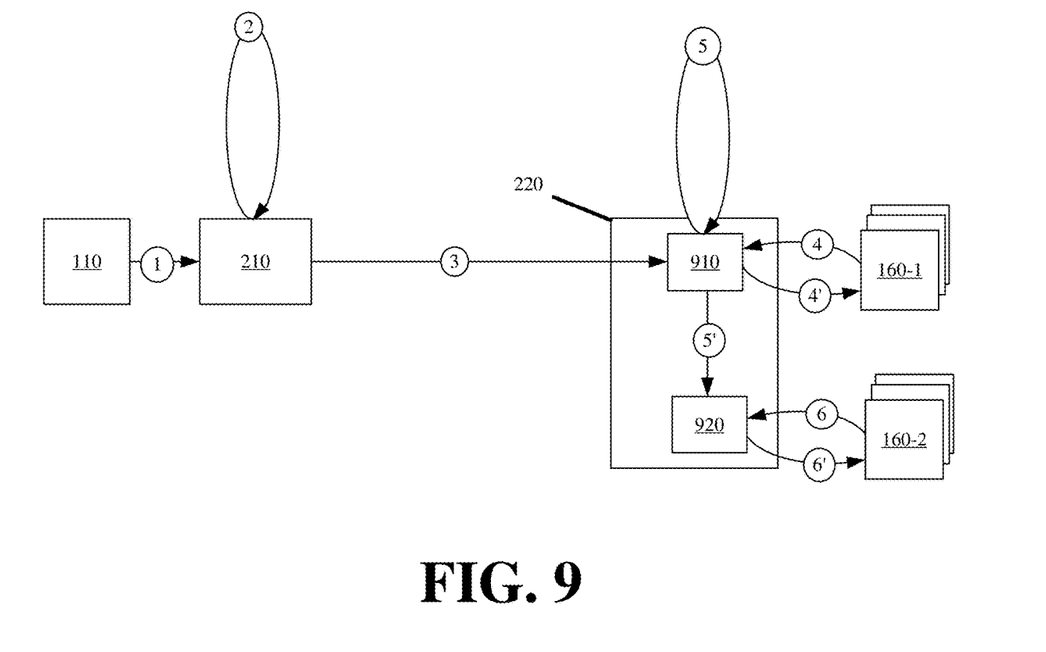
FIG. 9 conceptually illustrates performing the hybrid pull and push based streaming internally within a distribution PoP in accordance with some embodiments.

Thus far, the hybrid pull and push based streaming has been described with respect to PoP-to-PoP distribution of streams. In some embodiments, the hybrid pull and push based streaming may be performed internally within a PoP for server-to-server distribution of the streams. For instance, a first server in distribution PoP 220 may obtain a stream from source PoP 210 via the pull-based distribution or push-based distribution of the hybrid pull and push based streaming. Demand for the stream at distribution PoP 220 may increase, and a second server operating within distribution PoP 220 may be assigned, in addition to the first server, to respond to client requests for the stream. Rather than have the second server obtain the stream from source PoP 210 separate from the first server, distribution PoP 220 may perform the hybrid pull and push based streaming internally to distribute the stream from the first server to the second server via the pull-based distribution or the push-based distribution.

FIG. 9 conceptually illustrates performing the hybrid pull and push based streaming internally within distribution PoP 220 in accordance with some embodiments. Encoder may upload (at 1) a stream to source PoP 210. Source PoP 210 may determine (at 2) that demand for the stream from distribution PoP 220 exceeds a threshold, and begins to push (at 3) the stream segment data to a first server 910 in distribution PoP 220.

A cache of first server 910 is prepopulated with the stream segment data based on the push-based distribution performed by source PoP 210. Thus, when first server 910 receives (at 4) a request for the stream segment data, first server 910 may provide (at 4') the requested data immediately from cache.

Demand for the stream at distribution PoP 220 may continue to grow. First server 910 may monitor the demand, and may determine (at 5) that the demand has exceeded one or more thresholds. Accordingly, first server 910 may push (at 5') the stream segment data it receives from source PoP 210 to second server 920 operating in distribution PoP 220.

Second server 920 may then take over some load from first server 910 by receiving (at 6) one or more requests for the stream segment data from client devices 160-2, and by providing (at 6') the requested stream segment data that is prepopulated in second server 920 cache based on the push-based distribution of the stream segment data performed by first server 910. First server 910 may selectively push the stream segment data to additional servers in distribution PoP 220 should the demand continue to increase and more resources are needed to respond to the demand.

Server, device, and machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 10:
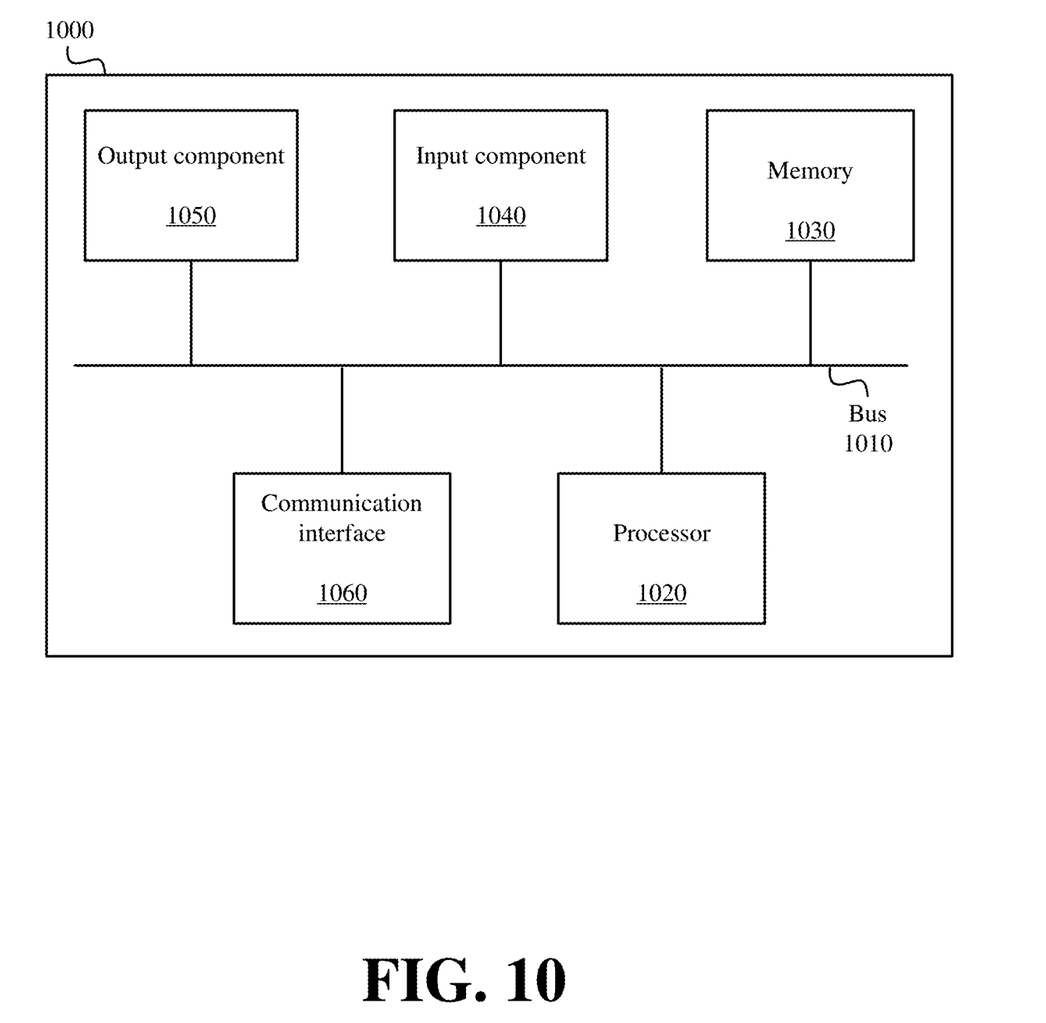
FIG. 10 illustrates example components of one or more devices, according to one or more embodiments described herein.

FIG. 10 is a diagram of example components of device 1000. Device 1000 may be used to implement certain of the devices described above (e.g., traffic management devices 120, servers of PoPs 110, origin storage 130, and client device 140). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a stream from an encoder at a source point-of-presence ("PoP") of a distributed platform;
   monitoring, at the source PoP, first demand from a first distribution PoP of a plurality of distribution PoPs of the distributed platform, wherein monitoring the first demand comprises determining an initial request from the first distribution PoP for a first segment of the stream and a first number of additional requests from the first distribution PoP for the first segment that arrive prior to the source PoP providing the first segment to the first distribution PoP in response to the initial request for the first segment;
   monitoring, at the source PoP, different second demand from a different second distribution PoP of the plurality of distribution PoPs, wherein monitoring the second demand comprises determining an initial request from the second distribution PoP for a second segment of the stream and a second number of additional requests from the second distribution PoP for the second segment that arrive prior to the source PoP providing the second segment to the second distribution PoP in response to the initial request for the second segment; and
   performing different pull and push based distributions of the stream from the source PoP to the first distribution PoP and the second distribution PoP during a common time interval based on a difference between the first demand and the second demand, wherein performing the different distributions comprises:
      performing a pull-based distribution of the stream to the first distribution PoP based on the first number of additional requests for the first segment from the first distribution PoP that arrive prior to the source PoP providing the first segment to the first distribution PoP being less than a threshold, and wherein performing the pull-based distribution incurs a first amount of delay based on the source PoP providing a particular stream segment to the first distribution PoP in response to a request for the particular stream segment from the first distribution PoP; and performing a push-based distribution of the stream to the second distribution PoP based on the second number of additional requests for the second segment from the second distribution PoP that arrive prior to the source PoP providing the second segment to the second distribution PoP being greater than the first demand and exceeding the threshold, and wherein performing the push-based distribution incurs a second amount of delay, that is less than the first amount of delay, based on the source PoP forwarding the particular stream segment to the second distribution PoP before the particular stream segment is requested by the second distribution PoP.

2. The method of claim 1, wherein performing the push-based distribution comprises receiving data for the particular stream segment from the encoder at the source PoP, and redistributing the data as the data is received from the source PoP to the second distribution PoP.

3. The method of claim 1 further comprising pushing data for the particular stream segment and subsequent segments of the stream to the second distribution PoP for a specific amount of time or a specific number of segments.

4. The method of claim 3 further comprising changing from the push-based distribution to the pull-based distribution for the second distribution PoP in response to the second demand becoming less than the threshold after the specific amount of time or the specific number of segments.

5. The method of claim 1, wherein each PoP of the plurality of distribution PoPs comprises one or more streaming servers redistributing the stream to requesting client devices.

6. The method of claim 1 further comprising redistributing the stream from the second distribution PoP with less delay to requesting client devices than from the first distribution PoP based on the push-based distribution prepopulating a cache of the second distribution PoP with the stream, and the pull-based distribution causing the first distribution PoP to retrieve the stream in response to a request received from a client device.

7. The method of claim 1 further comprising redistributing the particular stream segment from at least the first distribution PoP and the second distribution PoP with the second distribution PoP redistributing the particular stream segment before the first distribution PoP.

8. A device comprising:
one or more processors configured to:
receive a stream from an encoder;
monitor first demand from a first distribution point-of-presence ("PoP") of a distributed platform, wherein monitoring the first demand comprises determining an initial request from the first distribution PoP for a first segment of the stream and a first number of additional requests from the first distribution PoP for the first segment that arrive prior to providing the first segment to the first distribution PoP in response to the initial request for the first segment;
monitor different second demand from a different second distribution PoP of the distributed platform, wherein monitoring the second demand comprises determining an initial request from the second distribution PoP for a second segment of the stream and a second number of additional requests from the second distribution PoP for the second segment that arrive prior to providing the second segment to the second distribution PoP in response to the initial request for the second segment; and
perform different pull and push based distributions of the stream to the first distribution PoP and the second distribution PoP during a common time interval based on a difference between the first demand and the second demand, wherein performing the different distributions comprises:
perform a pull-based distribution of the stream to the first distribution PoP based on the first number of additional requests for the first segment from the first distribution PoP that arrive prior to providing the first segment to the first distribution PoP being less than a threshold, and wherein performing the pull-based distribution comprises delaying distribution of a stream segment to the first distribution PoP until the first distribution PoP issues a request for the stream segment; and
perform a push-based distribution of the stream to the second distribution PoP based on the second number of additional requests for the second segment from the second distribution PoP that arrive prior to the source PoP providing the second segment to the second distribution PoP being greater than the first demand and exceeding the threshold, and wherein performing the push-based distribution comprises forwarding data for the stream segment to the second distribution PoP prior to receiving a request for the stream segment from the second distribution PoP.

9. A system comprising:
a first distribution point-of-presence ("PoP");
a second distribution PoP; and
a source PoP configured to:
receive a stream from an encoder;
monitor first demand from the first distribution PoP, wherein monitoring the first demand comprises determining an initial request from the first distribution PoP for a first segment of the stream and a first number of additional requests from the first distribution PoP for the first segment that arrive prior to the source PoP providing the first segment to the first distribution PoP in response to the initial request for the first segment;
monitor different second demand from the second distribution PoP, wherein monitoring the second demand comprises determining an initial request from the second distribution PoP for a second segment of the stream and a second number of additional requests from the second distribution PoP for the second segment that arrive prior to the source PoP providing the second segment to the second distribution PoP in response to the initial request for the second segment; and
perform different pull and push based distributions of the stream to the first distribution PoP and the second distribution PoP during a common time interval based on a difference between the first demand and the second demand, wherein performing the different distributions comprises:
performing a pull-based distribution of the stream to the first distribution PoP based on the first number of additional requests for the first segment from the first distribution PoP that arrive prior to the source PoP providing the first segment to the first distribution PoP being less than a threshold, and wherein performing the pull-based distribution incurs a first amount of delay based on the source PoP providing a particular stream segment to the first distribution PoP in response to a request for the particular stream segment from the first distribution PoP; and performing a push-based distribution of the stream to the second distribution PoP based on the second number of additional requests for the second segment from the second distribution PoP that arrive prior to the source PoP providing the second segment to the second distribution PoP being greater than the first demand and exceeding the threshold, and wherein performing the push-based distribution incurs a second amount of delay, that is less than the first amount of delay, based on the source PoP forwarding the particular stream segment to the second distribution PoP before the particular stream segment is requested by the second distribution PoP.

\* \* \* \* \*